United States Patent [19]
Cooper

[11] Patent Number: 4,779,922
[45] Date of Patent: Oct. 25, 1988

[54] WORK STATION SYSTEM

[76] Inventor: Lloyd G. B. Cooper, 3825 Redmont Rd., Birmingham, Ala. 35213

[21] Appl. No.: 934,970

[22] Filed: Nov. 25, 1986

[51] Int. Cl.[4] .......................... A47B 39/00; A47C 7/62
[52] U.S. Cl. .................................... 297/188; 248/1 C; 297/171; 297/174
[58] Field of Search ............... 297/188, 170, 171, 174, 297/217, 417, 411, 313, 325, 259; 248/1 C

[56] References Cited

U.S. PATENT DOCUMENTS

| | | | |
|---|---|---|---|
| 1,469,928 | 10/1923 | Lazar | 297/217 X |
| 2,475,528 | 7/1949 | Strang et al. | 297/217 |
| 2,624,392 | 1/1953 | Bargen | 297/174 X |
| 2,725,095 | 11/1955 | Rodefeld | 297/170 |
| 4,134,614 | 1/1979 | Fielding, Sr. | 297/172 |
| 4,365,561 | 12/1982 | Tellier | 108/7 |
| 4,408,800 | 10/1983 | Knapp | 297/347 |
| 4,495,871 | 1/1985 | Nagata et al. | 108/20 |

FOREIGN PATENT DOCUMENTS

| | | | |
|---|---|---|---|
| 2567378 | 1/1986 | France | 248/1 A |
| 730745 | 5/1955 | United Kingdom | 297/217 |
| 2028117 | 8/1979 | United Kingdom | |

OTHER PUBLICATIONS

Luigi Colani: Designing Tomorrow-Car Styling No. 23-Imported from Japan by Kaneko Enterprises, Inc. 15641 Product Lane, A-10, Huntington, Calif. 92649.

Primary Examiner—James T. McCall
Attorney, Agent, or Firm—Griffin, Branigan, & Butler

[57] ABSTRACT

A work station for ergonometrically supporting a human operator in a seated position while the human operates equipment located on the work station. A chair (12) has a first portion (12b) contactable by a thigh of the seated opeator and a second portion (12c) contactable by the operator's back. The chair (12) is rockable about a horizontal axis of a main pivot shaft (28). A carriage (14) is secured proximate the front edge of the first portion (12b) of the chair (12). A surface for supporting an input device (16) and a surface for supporting a visual display device (18) are attached to the carriage (14). As the seated operator rocks about the horizontal axis of the shaft (28), the spatial distance between the surface for supporting an input device (16) and the seated operator remain essentially constant, as does the spatial distance between the surface for supporting the visual display (18) and the seated operator.

30 Claims, 14 Drawing Sheets

WORK STATION SYSTEM

BACKGROUND

I. FIELD OF THE INVENTION

The invention relates to furniture such as office furniture, and in particular relates to ergonometric work stations.

II. PRIOR ART AND OTHER CONSIDERATIONS

Machine operators such as typist and video display terminal operators frequently complain that the nature and positioning of the work surface upon which their equipment is placed causes fatigue. In particular, at a conventional desk an operator must sit, perhaps for hours, with the operator's back being essentially vertical in relation to the floor. Sitting erect subjects an individual's back to an increased bending moment which is substantially larger than the bending moment which is placed on an individual's spine when the individual is standing erect. This increased spinal loading for extended periods of time leads to back injury. Also, it is not uncommon for a conventional desk to be either too high or too low for a particular operator. The effect of such problems is to reduce the productivity of the employee.

Consequently, effort has been directed towards developing improved work stations. More recently the ergonometric relationships between the user and a computer or video display terminal have been brought into consideration, primarily because of the unique problems facing this type of system usage.

Various prior art devices provide a work surface which is ultimately connected to a seat. For many of these devices it is not possible to adjust the positioning of the work surface, such as the angle of inclination of the work surface. For other devices it is not possible to selectively adjust the extent to which the seat reclines, much less to make such a seat adjustment while maintaining a constant spatial relationship between the work surface and the seated operator.

In view of the above, it is an object of the present invention to provide a work station wherein the spatial distance between a work surface and a seated operator remains essentially constant as a seat is selectively adjustable about a horizontal axis.

An advantage of the invention is the provision of a work station for which an operator can selectively adjust the height and angle of inclination of a plurality of support surfaces.

Another advantage of the invention is the provision of an adjustable arm support which permits an operator to rest his arms in a range of comfortable positions.

Another advantage of the present invention is the provision of a work station for which the positioning of a work surface relative to a chair can be adjusted to take into consideration the physical characteristics and preferences of an operator.

SUMMARY

A work station for ergonometrically supporting a human operator in a seated position while the human operates equipment located on the work station. A chair has a first portion contactable by a thigh of the seated operator and a second portion contactable by the operator's back. The chair is rockable about a horizontal axis of a main pivot shaft. A carriage is secured proximate the front edge of the first portion of the chair. A surface for supporting an input device and a surface for supporting a visual display device are attached to the carriage. As the seated operator rocks about the horizontal axis of the pivot shaft, the spatial distance between the surfaces for supporting an input device and the seated operator remain essentially constant, as does the spatial distance between the surface for supporting the visual display device and the seated operator.

Because the entire structure pivots in unison about a central axis, the operator can change the angle of inclination of the entire system while maintaining an initially established optimal spacial relationship to the equipment. By altering this angle of inclination periodically, the operator can change his weight distribution along the support surface of the seat thereby altering tissue, skeletal and muscular loads while maintaining the optimal working spatial relationship to the equipment. Altering these physical loads and pressures over time helps greatly in reducing fatigue.

DETAILED DESCRIPTION OF THE DRAWINGS

Figure 1:
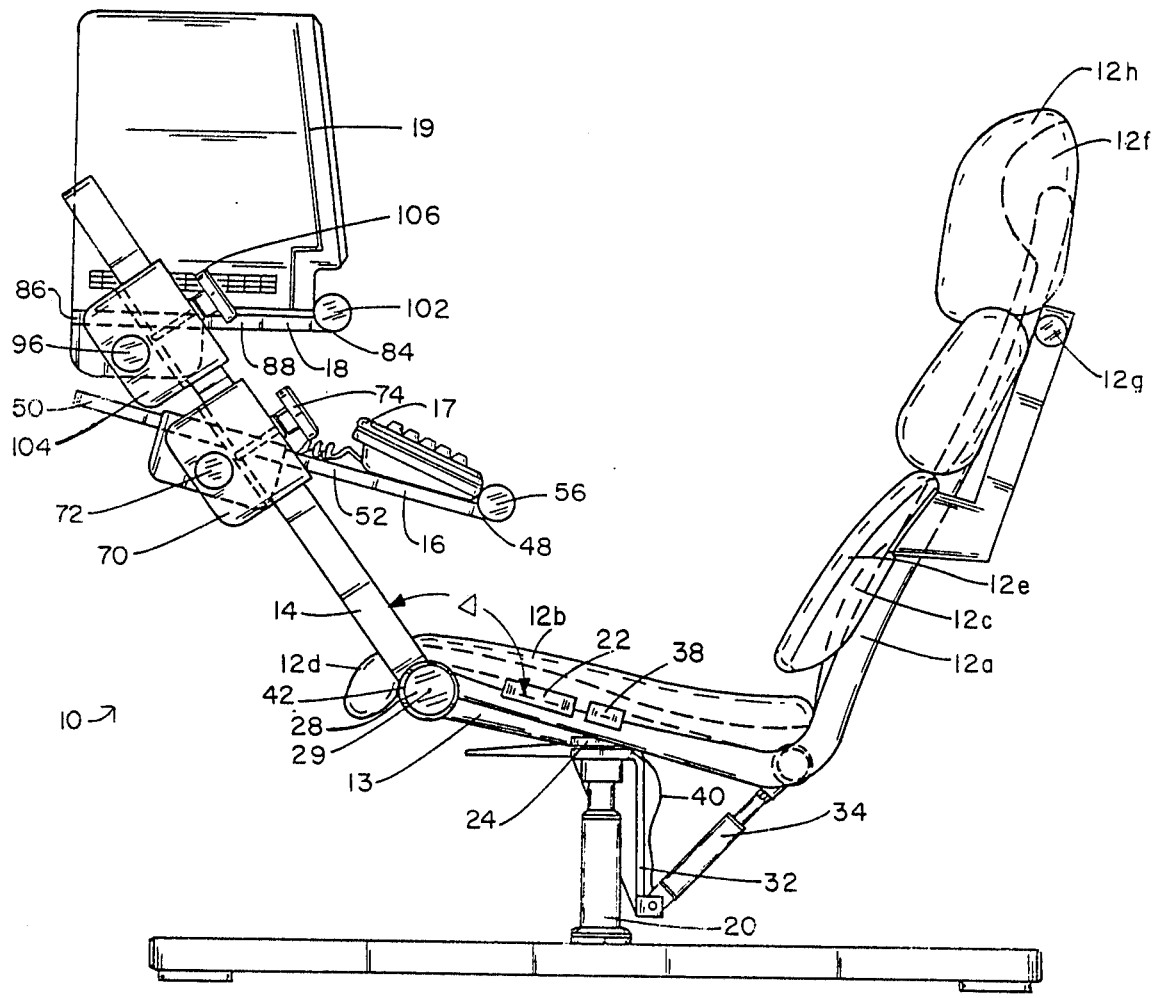
FIG 1 a side view of an ergonometric work station according to the embodiment of the invention.

An ergonometric work station 10 comprises a chair 12 for supporting a human operator in a seated position, a frame pivot substructure 13 (FIG. 4), a carriage 14, a first support means 16 for supporting a manually operated input device 17; and, a second support means 18 for supporting a visual display device 19. The work station 10 is manufactured from suitable materials, such as, for example, wood, plastic, metal or any combination thereof.

Chair 12 has a shape generally defined by a seat frame 12a. The chair 12 has a first portion 12b (contactable by the thigh portion of a seated operator) and a second portion 12c (contactable by the back of an operator). In a preferred embodiment, the seat frame 12a comprises two pieces of high-strength tubing attached to the underside of the first and second portions 12b, 12c and spaced apart by a distance approximately equal to the width of the first and second portion 12b, 12c. A front edge 12d of the first portion 12b of the seat is proximate the back of a seated operator's knee.

Arm supports 12e and head rest 12f are placed proximate the chair's second portion 12c. The arm supports 12e are coupled to each other through a structure affixed to the second portion 12c. The structure pivots about an axis located approximately half-way between the shoulder to seat surface distance for a 97.5 percentile male and a 2.5 percentile female (based on "Humanscale" by Niels Diffrient, published by MIT Press) as indicated at 12g in FIG. 1. The structure allows the operator's arms to rest in a range of confortable positions and to enable the arm supports 12e to follow the natural range of motion of the arms.

Figure 12:
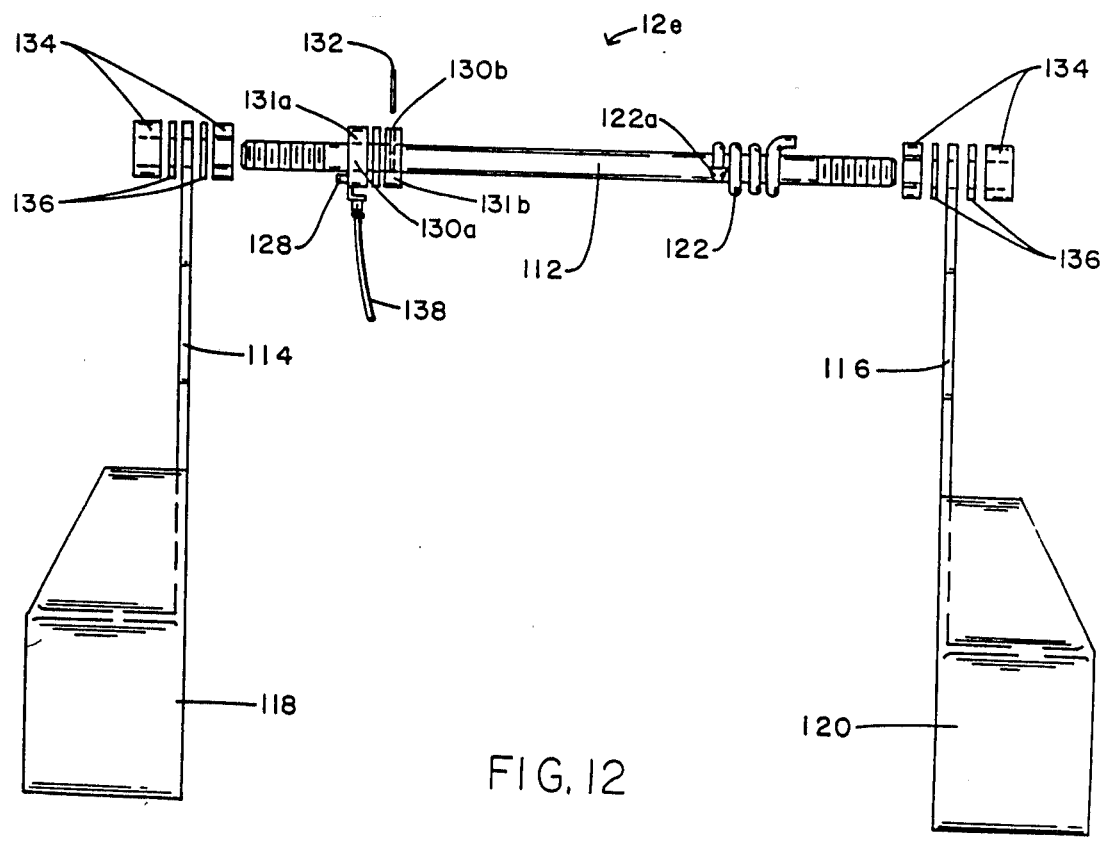
FIG. 12 is an exploded front view of an arm support means used in the embodiment of FIG. 1.
Figure 13:
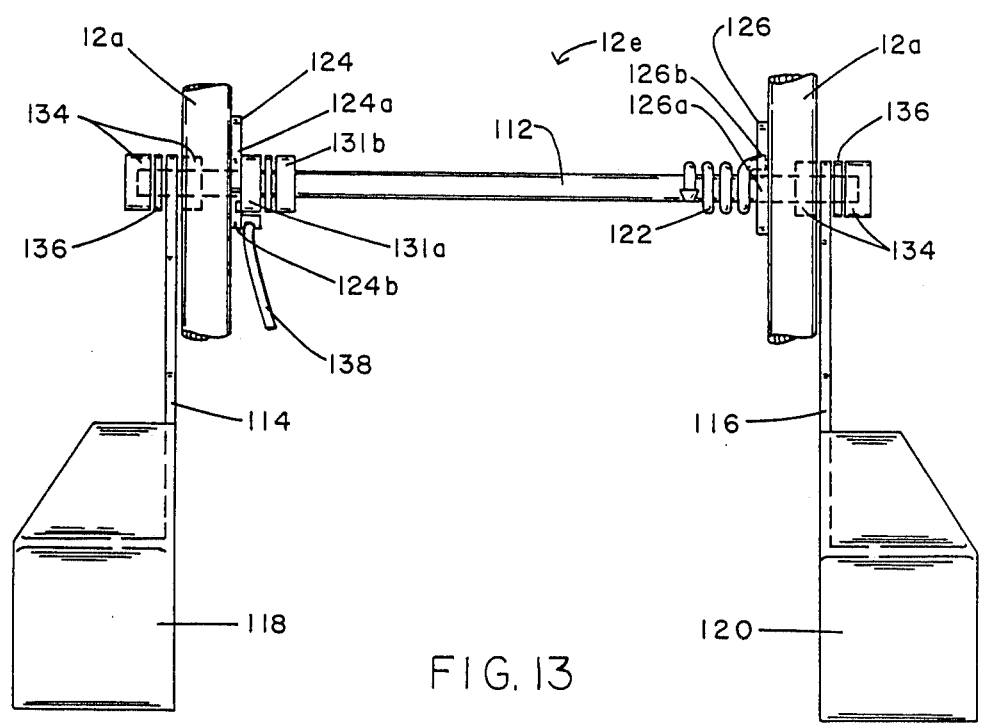
FIG. 13 is a front view of the arm support means used in the embodiment of FIG. 1.
Figure 14:
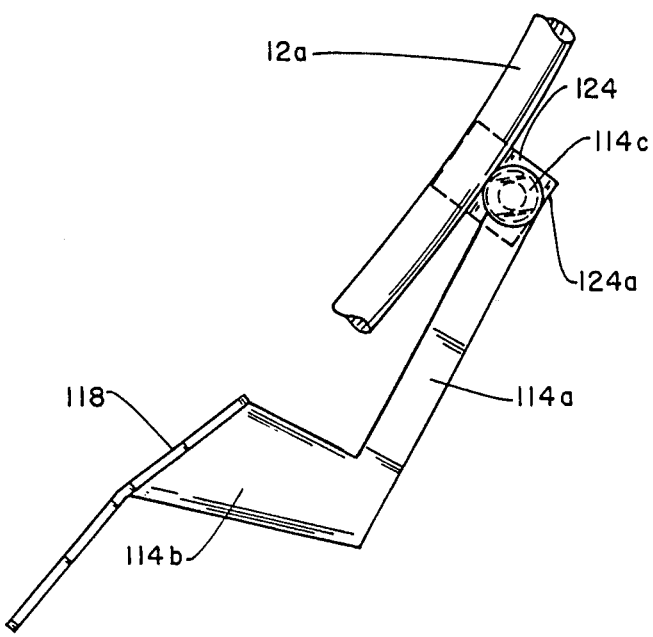
FIG. 14 is a side view of the arm support means shown in FIG. 13.

The arm supports 12e (FIGS. 12 and 13) comprise a connecting shaft 112, a pair of arm support brackets 114, 116, and a pair of arm support surfaces 118, 120. The length of the connecting shaft 112 is chosen to be greater than the width of the chair frame 12a. Each end of the connecting shaft 112 is threaded. Proximate a first end 112a (FIG. 12) of the connecting shaft 112 is a support spring 122, an inner end 122a of which is welded to the connecting shaft 112. As shown in FIG. 14 the arm support brackets 114, 116 are fabricated from a first portion 114a, 116a and a second portion 114b, 116b, the two portions being formed so as to be substantially perpendicular to each other. The free end of first portions 114a, 116a have holes 114c, 116c, respectively, formed therein to allow the arm support brackets 114, 116 to slide over the connecting shaft 112. The arm support surfaces 118, 120 are attached to the second portions 114b, 116b.

A pair of connecting shaft brackets 124, 126 are welded to the inside surface of the second portion 12c of the seat frame 12a. The brackets 124, 126 have first apertures 124a, 126a, respectively, of sufficient diameter to allow the connecting shaft 112 to pass therethrough. As shown in FIG. 13, shaft bracket 124 has a second aperture 124b proximate one end thereof to receive a lock pin 128 associated with a clutch mechanism 130. Shaft bracket 126 has a second aperture 126b proximate one end of the support bracket 126 to receive the free end of the support spring 122.

The clutch mechanism 130 comprises a fixed portion 131a having the lock pin 128 and a free portion 131b. A first opening 130a through the fixed and free portions allows the clutch mechanism 130 to fit over the connecting shaft 112. A second opening 130b, made in the free portion 131b perpendicular to the first opening 130a, is adapted to receive a coupling pin 132.

The clutch 130 is slid over the connecting shaft 112 which is then inserted into the left connecting shaft bracket 124 and backed into the right connecting shaft bracket 126 that the free end of the support spring 122 is inserted into the second aperture 126b. The clutch 130 is moved to the left so that the lock pin 128 slides into the second aperture 124b. The coupling pin 132 is inserted through the second opening 130b and a hole (not shown) aligned with the second opening 130b to mate the two elements together. Finally, the arm support brackets 114, 116 are affixed to the connecting shaft ends using nuts 134 and lock washers 136.

A pair of vision cushions 12h project forwardly from each side of the head rest 12f. The vision cushions 12h function to block an operator's peripheral view, thus increasing forward concentration. In addition, the cushions 12h block extraneous noises.

The chair 12 is positioned a selectable distance above the floor by lift adjustment cylinders 20 which are operatable by a first control lever 22 to raise or lower the chair 12. Top portion 20a of the lift adjustment cylinders 20 are connected to the frame pivot substructure 13.

Figure 4:
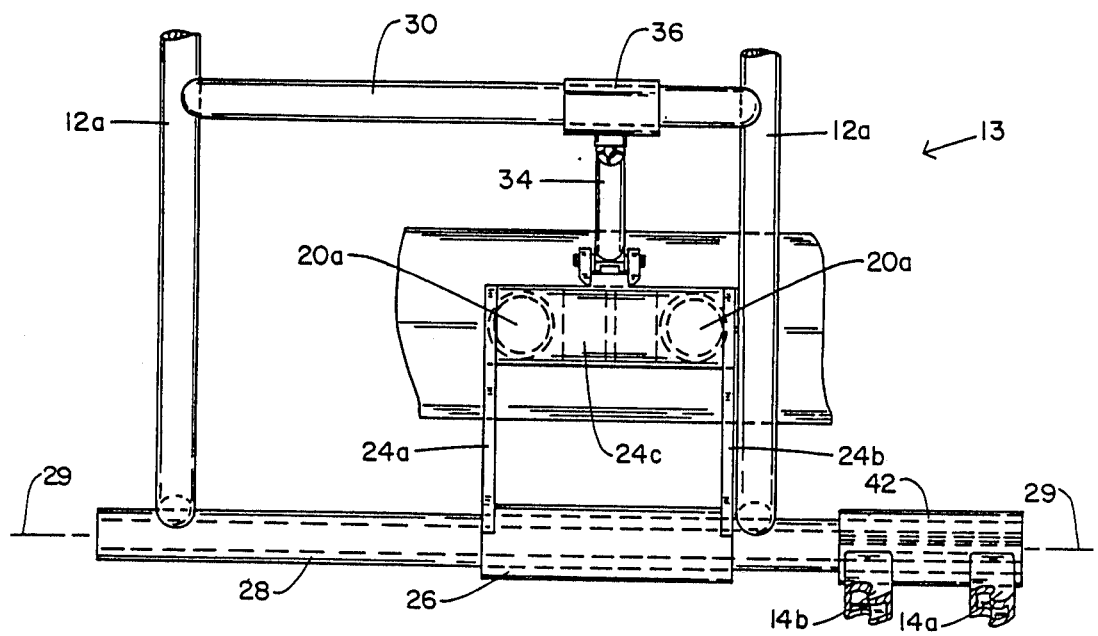
FIG. 4 is a top view of a frame pivot substructure used in the embodiment shown in FIG. 1.

As seen in FIG. 4, frame pivot substructure 13 comprises a U-shaped support bracket 24. The underside of intermediate member 24c of bracket 24 is attached to the top portion 20a of the air cylinders 20. Two parallel members 24a, 24b of the support bracket 24 are attached to a main bushing sleeve 26 which is slid over a cylindrical main pivot shaft 28. The portion of the seat frame 12a that is proximate the front edge 12d of the seat is attached to the pivot shaft 28 by any suitable means, such as by welding. A recline cylinder shaft 30 is attached to the two seat frame tubings 12a a predetermined distance from the main pivot shaft 28. The recline cylinder shaft 30 is welded to the seat frame 12a and is parallel to the main pivot shaft 28.

A lower depending bracket 32 is attached to the support bracket 24 proximate the air cylinders 20. One end of a recline adjustment cylinder 34 is secured to the lower depending bracket 32 using a screw and nut. As shown in FIG. 4 the other end of the cylinder 34 is attached to a recline bushing sleeve 36 which slides over the recline cylinder shaft 30. A second control lever 38, attached to the recline adjustment cylinder 34 by a cable 40, allows the main pivot shaft 28 (and consequently the chair 12) to rotate about the main bushing sleeve 26 and thus about horizontal axis 29.

Figure 2:
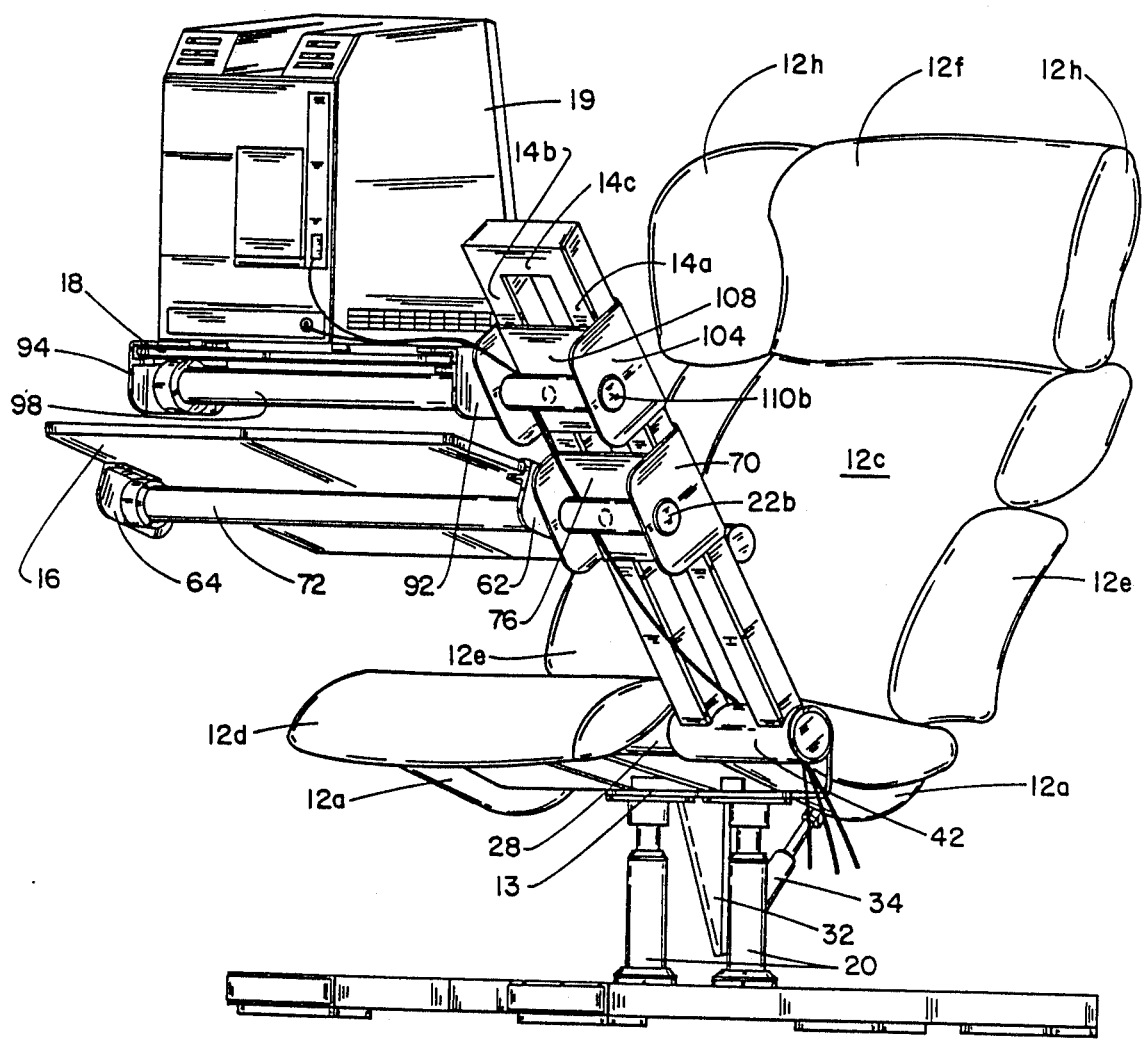
FIG. 2 is a front projected view of the work station of FIG. 1.
Figure 3:
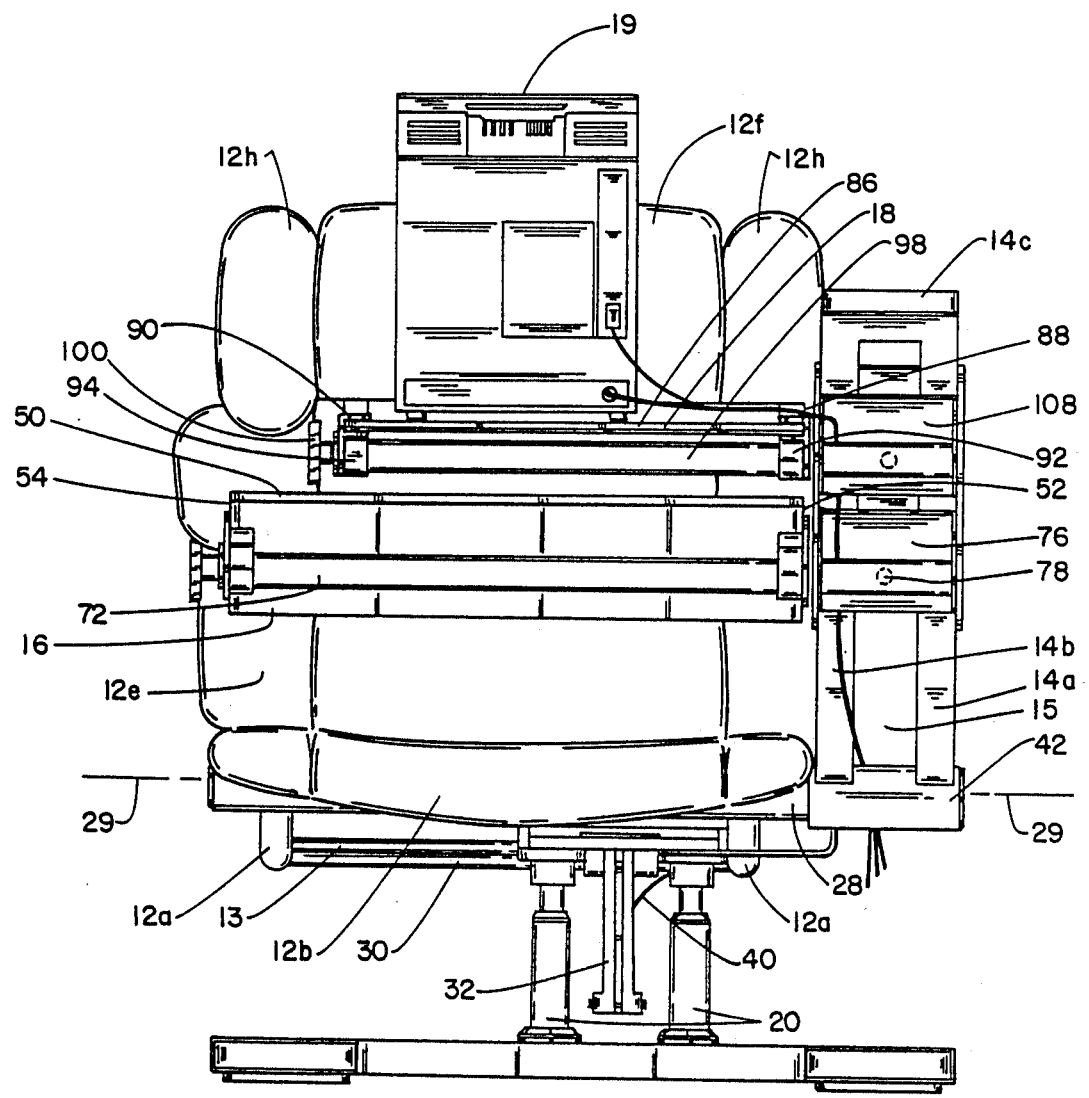
FIG. 3 is a front view of the work station of FIG. 1.

Carriage 14 is attached to the chair 12 proximate the front edge 12d of the first portion 12b. In a first embodiment depicted inter alia in FIGS. 1 and 2, carriage 14 comprises two parallel, elongated frame members 14a and 14b which are spaced apart from each other a predetermined distance. Bottom ends of the carriage members 14a, 14b are connected to an essentially cylindrical carriage attaching means such as carriage attachment cylinder 42. The top ends of carriage members 14a, 14b are connected together by member 14c. A channel 15 is formed between the carriage members 14a, 14b. Alternatively, the carriage can be a single member having a channel formed therein.

Figure 5:
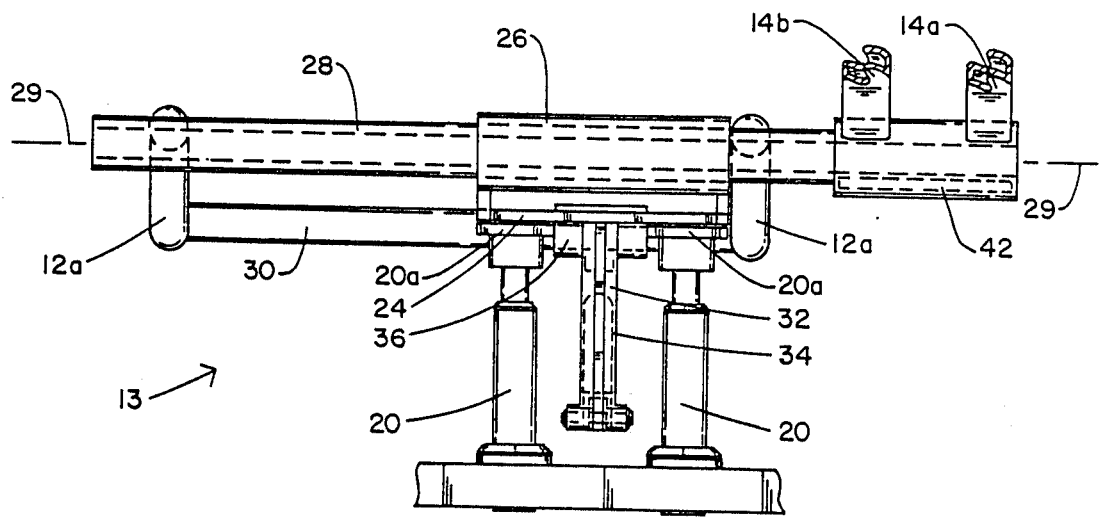
FIG. 5 is a front view of the frame pivot substructure shown in FIG. 4.
Figure 6:
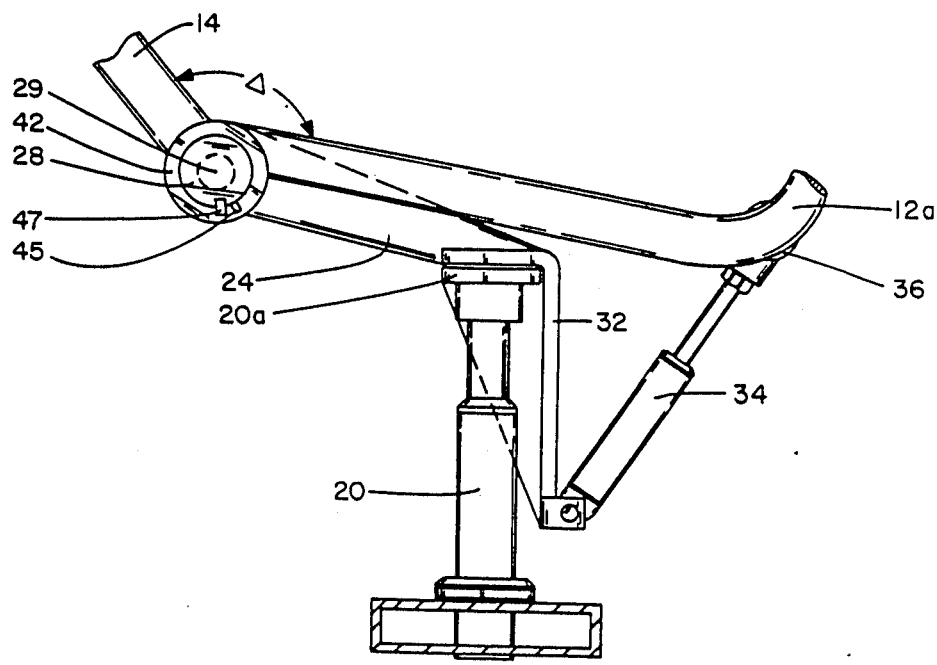
FIG. 6 is a side view of the frame pivot substructure of FIG. 4, and showing a portion of a chair frame in a raised, relatively level position.
Figure 7:
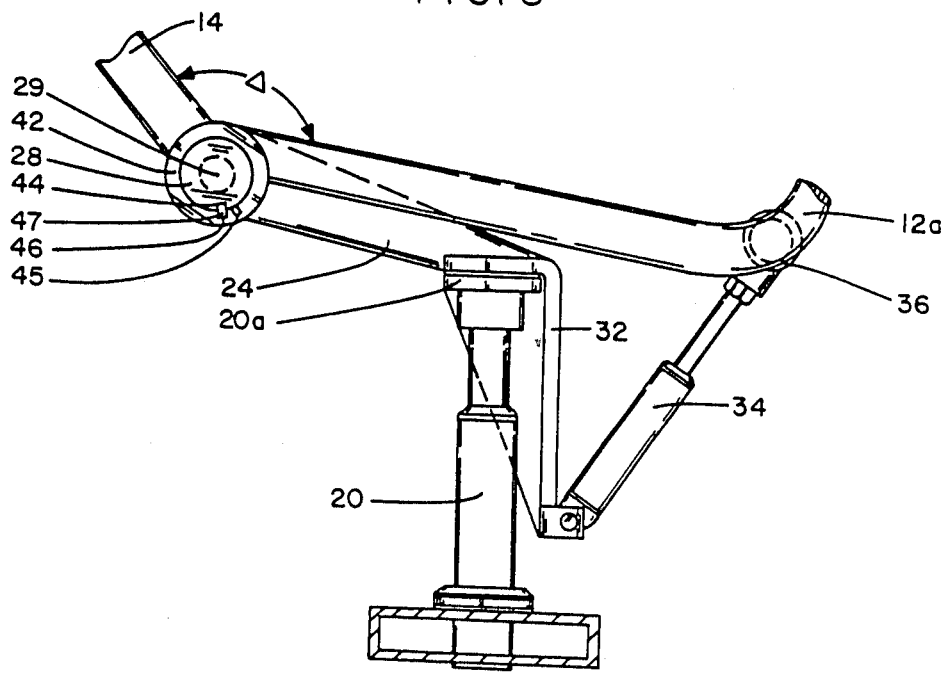
FIG. 7 is a side view of the frame pivot substructure of FIG. 4, and showing a portion of a chair frame in a lowered, angled position.

As shown in FIGS. 4 and 5, the carriage 14 is attached to the chair 12 by the carriage attaching cylinder 42. In this respect, the carriage attachment cylinder 42 is placed over the end of the main pivot shaft 28 and, as shown in FIGS. 6 and 7, is positioned by a first slot 44 which can be aligned with a second slot 45 or a third slot 46 and locked in place with a key 47 and is manipulated to change angle delta of the carriage 14.

First device support means 16 is attached to the carriage 14. In the illustrated embodiment, supporting means 16 is a flat surface having a front edge 48, a rear edge 50, and two sides 52 and 54. The top surface of the front edge 48 has a wrist support 56 provided thereon to prevent items from falling off and also to provide a supporting surface for the operator's wrists. A pair of wrist support adjustment knobs 58 are positioned inside the front edge 48 of the first supporting means 16 (as indicated at 60 in FIG. 10) to raise and lower the wrist support 56 in relation to the first support means 16. Attached to the two sides 52 and 54 proximate a selected point between the front and rear edges 48,50 are a first pair of support brackets 62 and 64. A part of the brackets 62,64 which is perpendicular to the first flat surface 16 has an opening (unnumbered) therein to receive a first support level adjusting means 66 (to be discussed below), such as a support shaft 72, and a threaded rod having a tilt adjustment knob 67 attached to its head portion. A spacer, such as a washer 62a is positioned against the outer surface of the support bracket 62 while a second spacer, such as a washer 64a is positioned against the outer surface of the support bracket 64.

Figure 8:
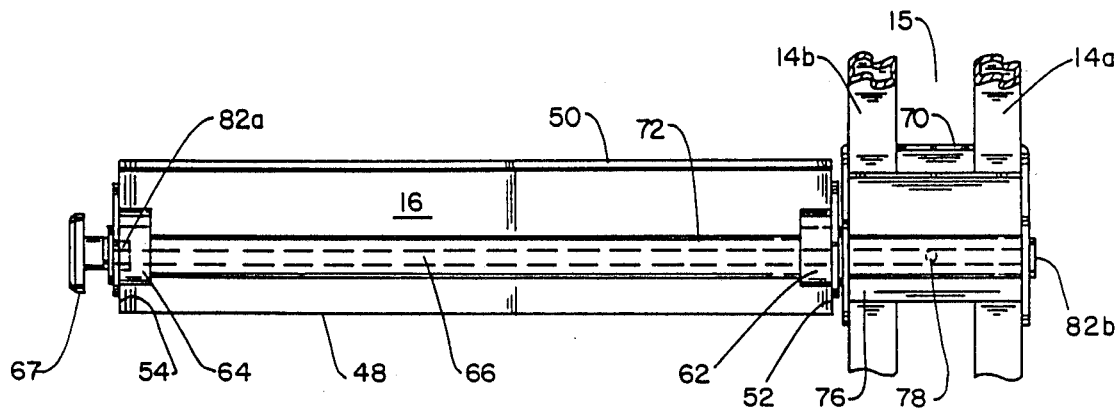
FIG. 8 is a partial front view of a supporting means used in the embodiment of FIG. 1.
Figure 9:
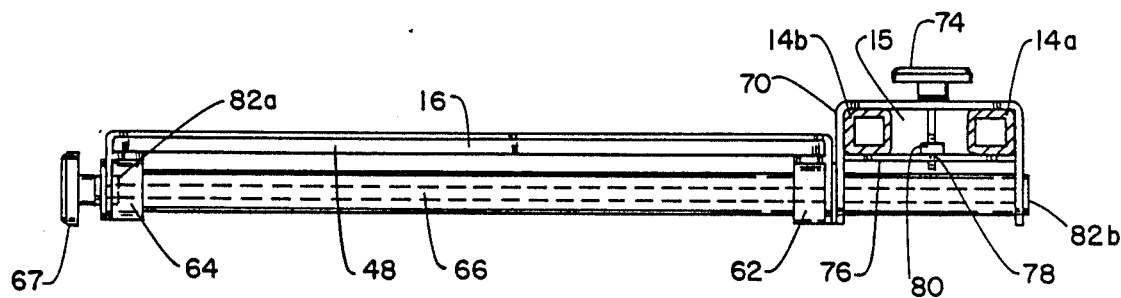
FIG. 9 is a partial front view, partially sectioned, of a supporting means used in the embodiment of FIG. 1.
Figure 10:
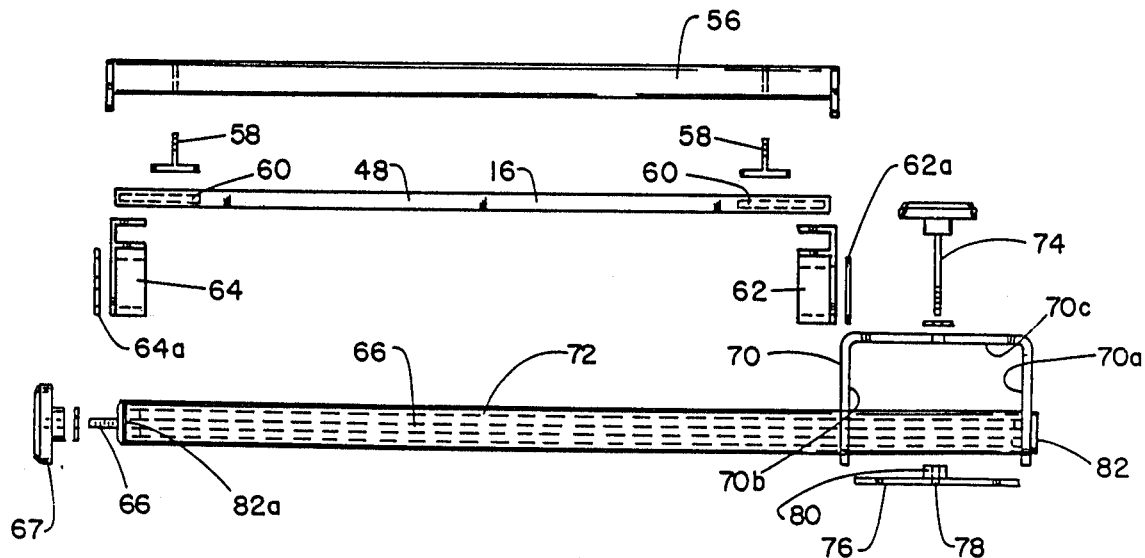
FIG. 10 is an exploded front view of the supporting means of the embodiment of FIG. 1.
Figure 11:
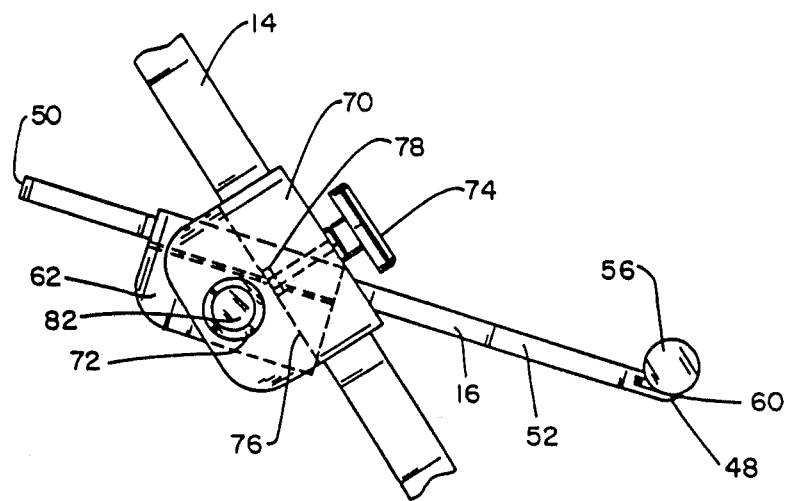
FIG. 11 is a side view of a support height adjusting means used in the embodiment of FIG. 1.

Associated with the first device supporting means 16 is a first support height adjusting means such as a U-shaped carriage housing bracket 70 having two parallel surfaces positioned a predetermined distance apart from each other by a third surface which is perpendicular and intermediate the other two surfaces. The carriage housing bracket 70 has holes 70a, 70b, 70c created in the respective three surfaces proximate the center point of each surface. The holes 70a and 70b in the two parallel surfaces are large enough to accept the support shaft 72. The support shaft 72 is secured to the carriage housing bracket 70 by suitable means, such as by welding. The carriage 14 is placed through the bracket 70 and secured with the aid of first support height locking means, such as a carriage adjustment knob 74. Knob 74 passes through the top hole 70c in the bracket 70 and channel 15, as shown in FIGS. 8 to 10, and engages, on the underside of the carriage 14, an associated first plate 76 (FIG. 10) having a hole 78 and nut 80 to accept the carriage adjustment knob 74. Tightening the carriage adjustment knob 74 secures the carriage housing bracket 70 to the carriage 14.

First device supporting means 16 is secured to the carriage housing bracket 70 (and thus the carriage 14) through the first support level adjusting means 66. In the illustrated embodiments, the first support level adjusting means 66 has a tilt adjustment knob 67 that is screwed onto the end of the support shaft 72 that passes through an end cap 82a. The support surface 16 is tilted in relation to the support shaft 72 by adjusting the tilt adjustment knob 67. When the tilt adjustment knob 67 is loosened, the first support surface 16 is no longer in compression and the first support surface 16, along with the first support brackets 62, 64 are free to rotate about the support shaft 72. Tightening the tilt adjustment knob 67 compresses the support brackets 62,64, against the support surface 16, locking the assembly between the tilt adjustment knob 67 and the carriage housing bracket 70.

Second device supporting means 18, also attached to the carriage 14, is in the illustrated embodiments a second flat surface having a front edge 84, a rear edge 86 and two sides 88 and 90. A second pair of support brackets 92 and 94 are attached to the two sides 88,90 at a selected point between the front and rear edges 84 and 86. These brackets also include an opening (unnumbered) therein to receive a second support level adjusting means 96, such as a threaded rod and support shaft 98. The threaded rod 96 has a tilt adjustment knob 100. The top of surface 18 includes a support 102 along the front edge 84 to retain items placed on the flat surface 18.

Second device supporting means 18 is attached to the carriage 14 in the same manner as described for the input device supporting means 16. Adjustable display height means, such as a second carrige housing bracket 104, is welded to the support shaft 98. The carriage housing bracket 104 is slid over the carriage 14 and secured to the carriage with a second support height locking means 106 which engages an associated second carriage plate 108 on the opposite side of the carrige 14. The threaded rod 96 having the second tilt adjustment knob 100 is inserted through a second end cap 110a, the support shaft 98 and screwed into a second end cap 110b. The second device supporting means 18 is then slid over the carriage 14 and secured in the same manner as for the first device supporting means 16.

In use, a visual display device 19, such as a computer with a monitor, is placed on the second flat surface 18. An input device 17, such as a keyboard, is placed on the first flat surface 16. An operator is seated in the chair 12 and proceeds to adjust the work station according to the operator's preference. The height of the chair is set by operating the first control lever 22. The operation of the first control lever raises or lowers the main pivot shaft 28 by extending or retracting the lift adjustment cylinders 20. Next, the angle delta of the carriage 14 is adjusted to the operator's preference by using the key 47 to align slot 44 with either slot 45 or slot 46 on the shaft 28. This particular step is not necessarily performed with every system usage, but rather when vastly different sized individuals use the same system. Finally, the second control lever 38 is manipulated to operate the recline adjustment cylinder 34, which rotates the shaft 28 about the bushing sleeve 26, tilting the work station.

The arm supports 12e are adjusted in relation to the seat frame 12a by manipulating a control cable 138 attached to the clutch mechanism 130. The other end of the control cable 138 is attached to a control lever (unilustrated). Releasing the tension on the cable 138 unlocks the clutch mechanism, permitting the arm support surfaces 118, 120 to move forward (due to tension produced by the supporting spring 122) or be manually pushed back. Increasing the tension on the control cable 138 locks the clutch mechanism 130, locking the arm supports 12e in place.

After the initial adjustments are made, the desired heights of the first support means 16 (upon which the keyboard 17 is placed) and the second support means (upon which the monitor 19 is placed) are set. The first support height locking means 74 is loosened (so that the first support means 16 can be lowered or raised on the carriage 14). When the desired height is reached the locking means 74 is tightened. In a similar manner, the second support height locking means 106 is loosened so as to adjust the height of the second support means 18 on the carriage 14. Tightening the locking means 74 and 106 prevents further changes in the height of the support means.

Finally, the support means 16,18 are given a desired tilt. Tilt adjustment knob 67 is loosened to set the tilt of the first support means 16. Likewise, tilt adjustment knob 100 permits the tilt of the second support means 18 to be adjusted. When the desired tilt is set, the knobs 67 and 100 are tightened.

Once the above described adjustments are completed, the spatial distance between the keyboard and the operator and the spatial distance between the monitor and the operator will remain essentially constant as the operator rocks about the horizontal axis 29 of the main pivot shaft 28.

SECOND EMBODIMENT

Figure 18:
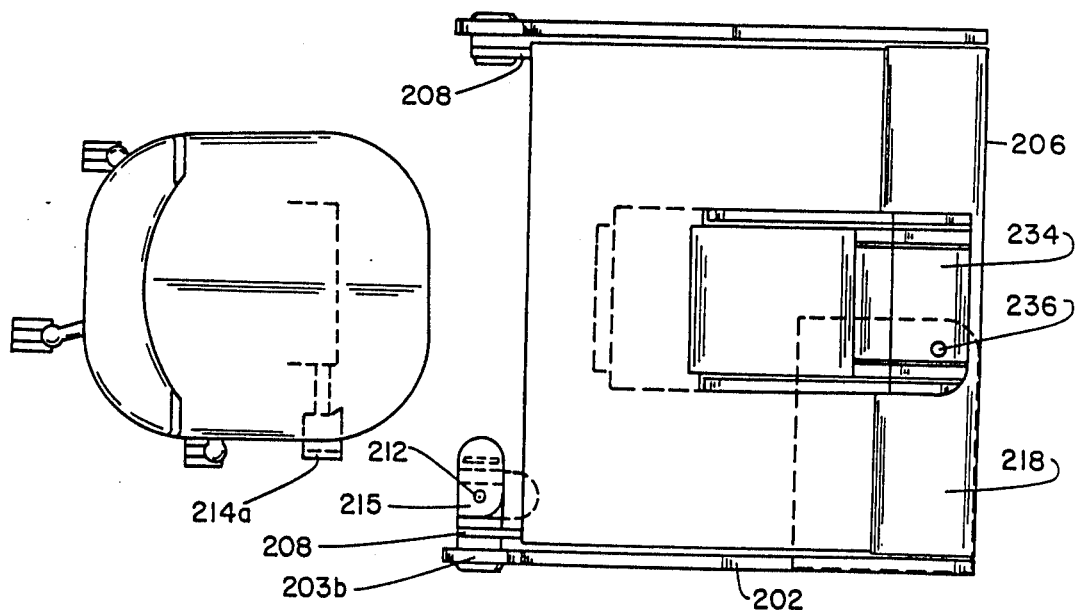
FIG. 18 is a top view of the embodiment of FIG. 15 showing a chair de-coupled from a workstation.

A second embodiment of the invention is shown with reference to FIGS. 15-26. In accordance with the second embodiment, an enclosure frame or desk 200 has two sides 202 and 204 and a back 206 (FIG. 18). A U-shaped carriage 208 (FIG. 16) is connected to flanges 203a, 203b proximate the front edges of the two frame sides 202 and 204 by a connecting shaft 210 and chair interface shaft 211. Connecting shaft 210 secures portion 208a. Chair interface shaft 211 secures portion 208b of the carriage 208 to flang 203b. The carriage 208 comprises two parallel portions 208a and 208b, spaced a predetermined distance apart by a third rear perpendicular portion 208c. The rear portion 208c of the carriage 208 is secured to a first device supporting means 216 (such as a first surface) by an adjustable slide mechanism 213. The adjustable slide mechanism 213, which is placed proximate the two edges of the rear portion 208c that mate with portions 208a, 208b, allows the first surface 216 to slide back and forth on the rear portion 208c of the carriage 208. A second device supporting means 218, such as a second surface, is located a predetermined distance above the input device supporting means, being attached to the back 206 at top portion 206a.

Chair interface shaft 211 is adapted to mate with coupling shaft 214, by the aid of an interface 215. The interface 215 (FIG. 25) comprises an essentially rectangular block having a tapered edge with a first L-shaped notch 215a, a straight edge with a second notch 215b, and two parallel sides. An aperture 215c is placed in the two parallel sides proximate the straight edge and perpendicular to the second notch 215b.

The chair interface shaft 211 (FIG. 23-25) comprises a cylindrical shaft having a first end 211a with a threaded hole 211b, a second end 211c with an aperture 211d and a threaded outer body 211e. The first end 211a has a bushing 211f placed over its circumference, after which the assembly is passed through an opening in the flange 203b proximate the front of the desk 200 and secured by a screw 211g screwed into the threaded hole 211b. The second end 211c passes through an opening in portion 208b of the carriage 208 and is secured by an interface shaft nut 220 screwed over the outer body 211e. Portion 208b is thus positioned between lip 211h and the shaft nut 220. The second end 211c is then placed into the second notch 215b of interface 215 and secured by locking pin 212. Locking pin 212 passes through opening 215c in the interface 215 and aperture 211d of the shaft 211.

Means for moving the carriage 208, such as a piston or air cylinder 222, has one end connected to a first surface pivot shaft 208d of the carriage 208. The pivot shaft 208d (FIG. 16) comprises a cylindrical shaft that runs parallel to the carriage component 208c and is affixed to the carriage sides 208a, 208b. The carriage component 208c can be rotated about the pivot shaft 208d and is held in place in relation to the shaft by means of frictional fit between the shaft 208d and bushings of the carriage component 208c through which the shaft 208d passes. The other end of the piston 222 is attached to a U-shaped bracket 207 which is secured to bottom portion 206b of the back 206 of the desk 200 (see FIG. 15). The actuator 222 may be secured using screws and nuts. The end of the actuator 222 secured to the desk 200 is not movable. The air cylinder 222 includes a control valve 223 that is operated by a cable 226 placed at a convenient spot proximate the input device supporting means 216.

An operator supporting means, such as a chair 228, has a first portion 228a, a second portion 228b, legs 228c (which raise the chair a predetermined distance above the floor) and a horizontal rocking axis 232 which pivots about the coupling shaft 214. The chair 228 is coupled to the carriage 208 by moving the chair towards the desk 200 until the coupling shaft end 214a (which has an L-shaped end) (FIG. 23) becomes aligned with interface 215. The L-shaped end of the coupling shaft 214a is then inserted into the L-shaped notch 215a of the interface 215.

In use, the surface 216 of the work station can be adjusted over a wide range of angles and heights, as indicated by FIGS. 15-22. To achieve a setting desired by an operator. The interface 215 must be positioned in relation to the carriage 208b. This position is accomplished by loosening the interface shaft nut 220. The carriage 208 is then adjustable without rotating the interface 215. When the desired horizontal height of the first surface 216 is obtained, the interface shaft nut 220 is retightened on the interface shaft 211 so as to lock the carriage side 208b to the interface assembly. Control valve 223 is then operated to control the piston 222.

Figure 15:
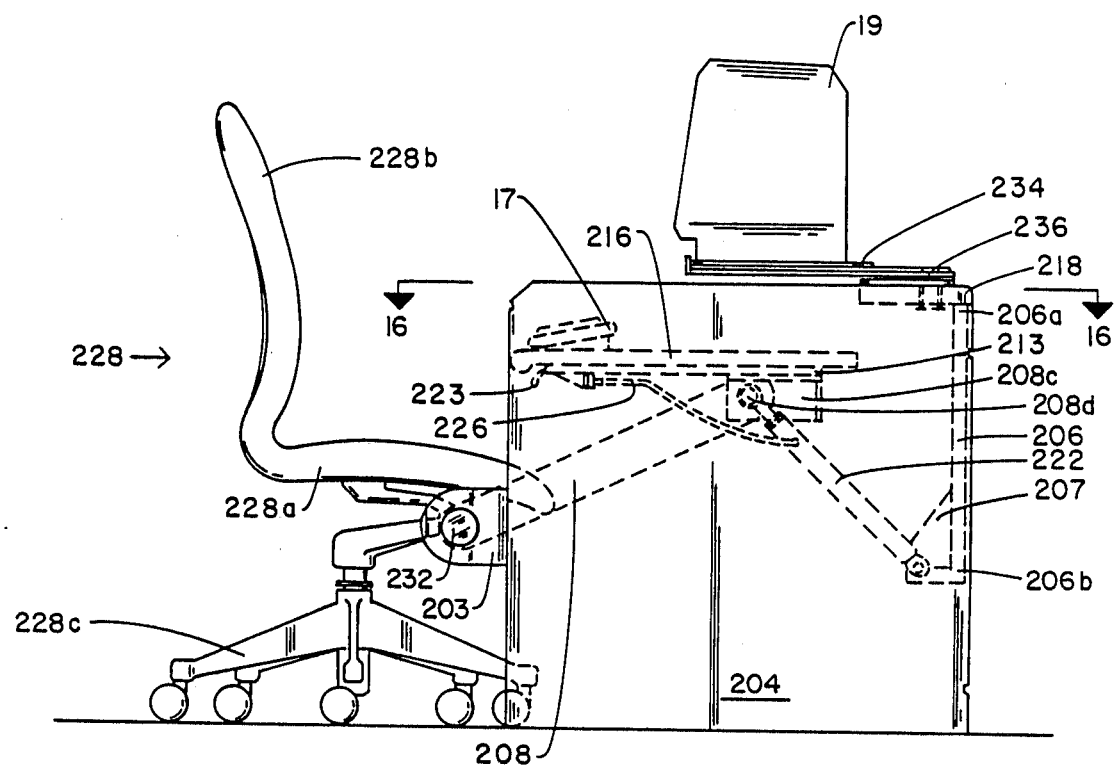
FIG. 15 is a side view of an ergonometric work station according to a second embodiment of the invention.
Figure 16:
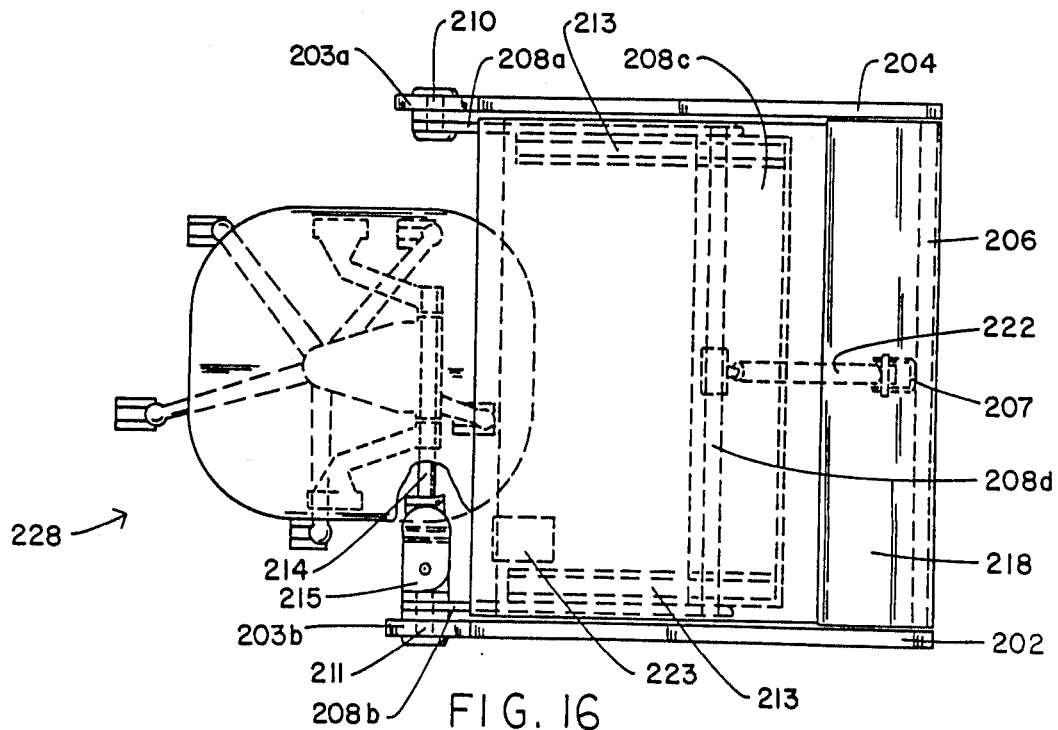
FIG. 16 is a top view taken along lines 16—16 of FIG. 15, also showing a chair coupled to the work station.
Figure 17:
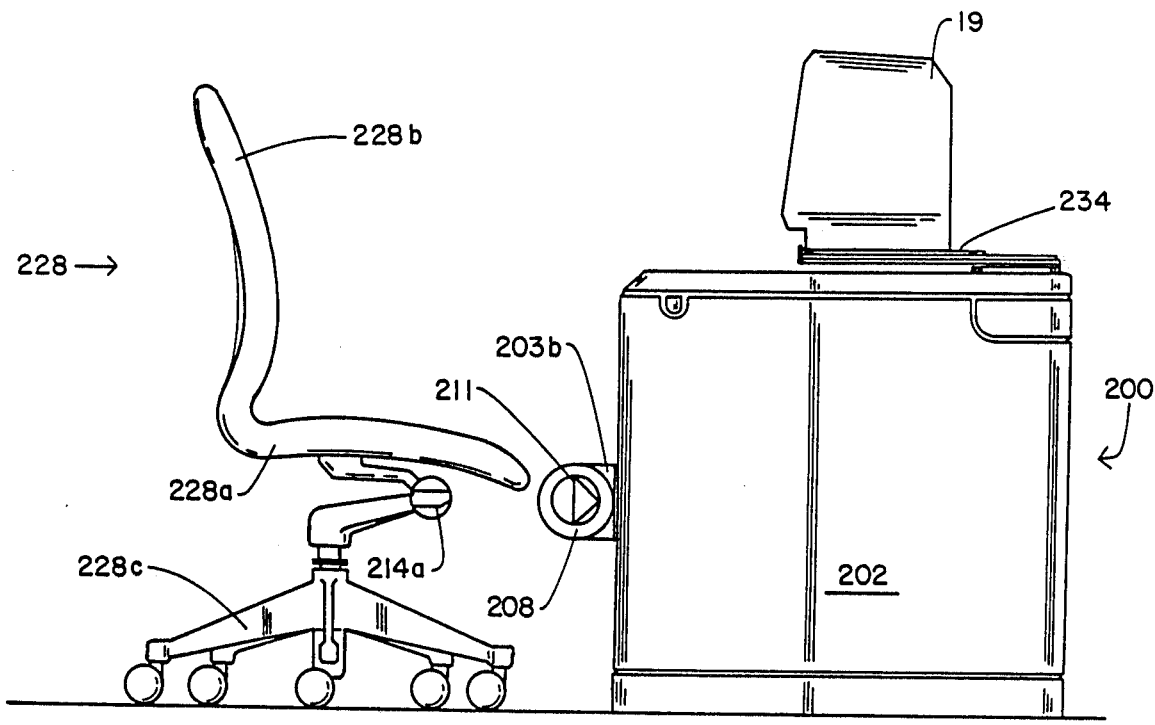
FIG. 17 is a side view of an ergonometric work station according to the embodiment of FIG. 15, showing a chair de-coupled from the work station.
Figure 19:
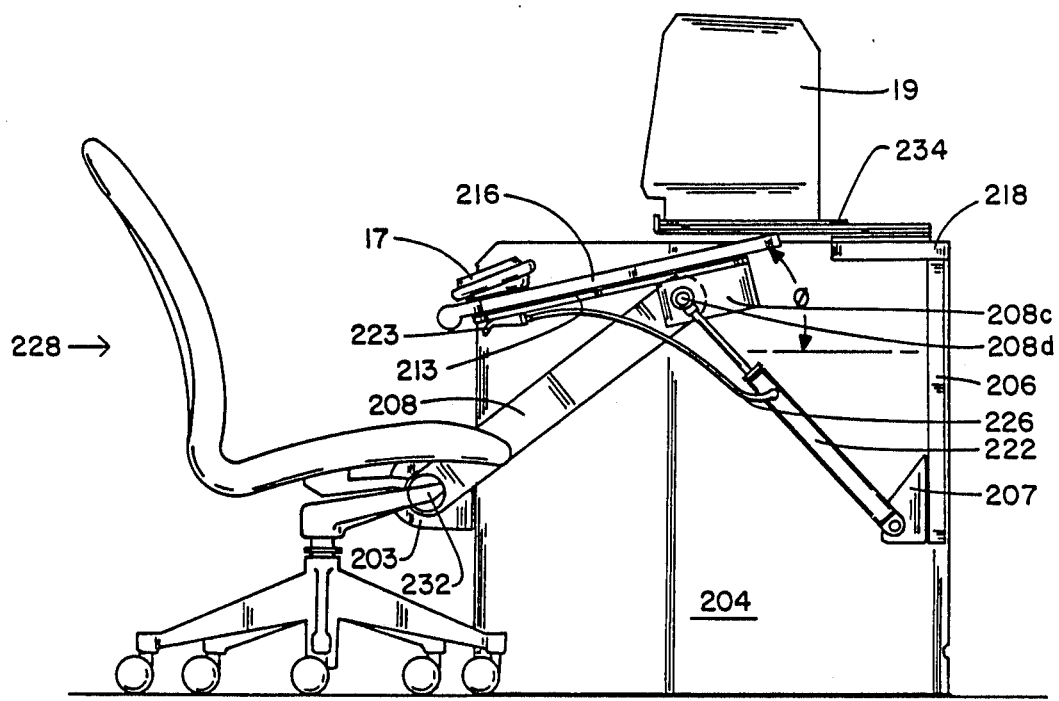
FIG. 19 is a side view of the embodiment of FIG. 15 with the sidewall removed, and further showing a support means in an inclined position.
Figure 20:
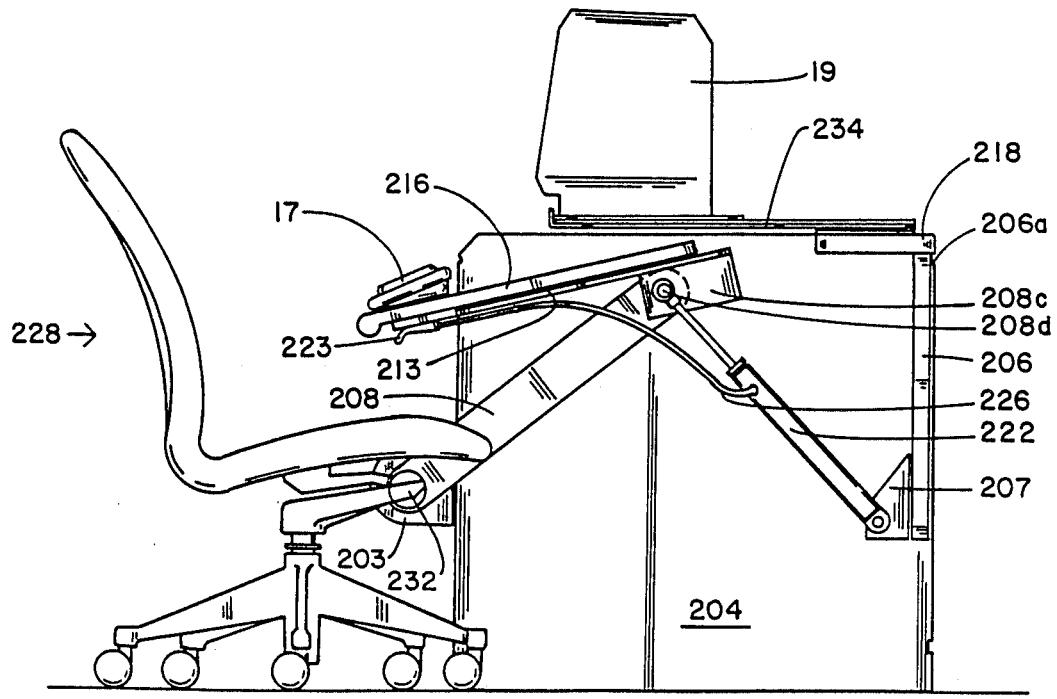
FIG. 20 is a side view of the embodiment of FIG. 15 in which the support means is extended towards a chair.
Figure 21:
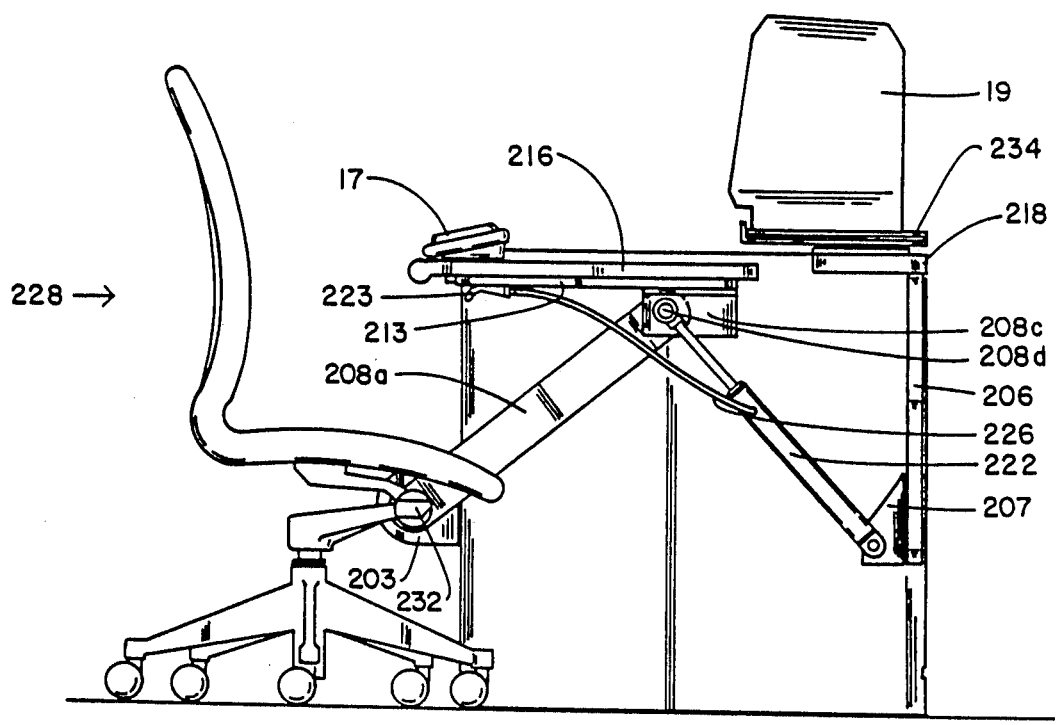
FIG. 21 is a side view of the invention according to the embodiment of FIG. 15 showing the support means in a raised, level position.
Figure 22:
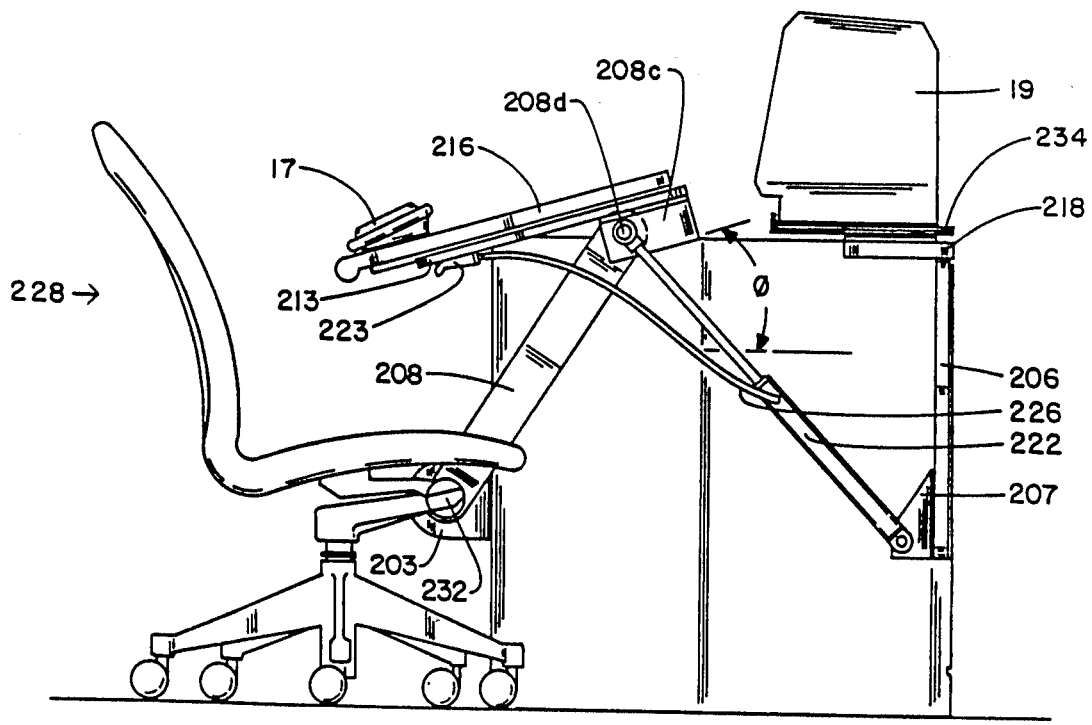
FIG. 22 is a side view of the embodiment of FIG. 21 wherein the support means is tilted.
Figure 23:
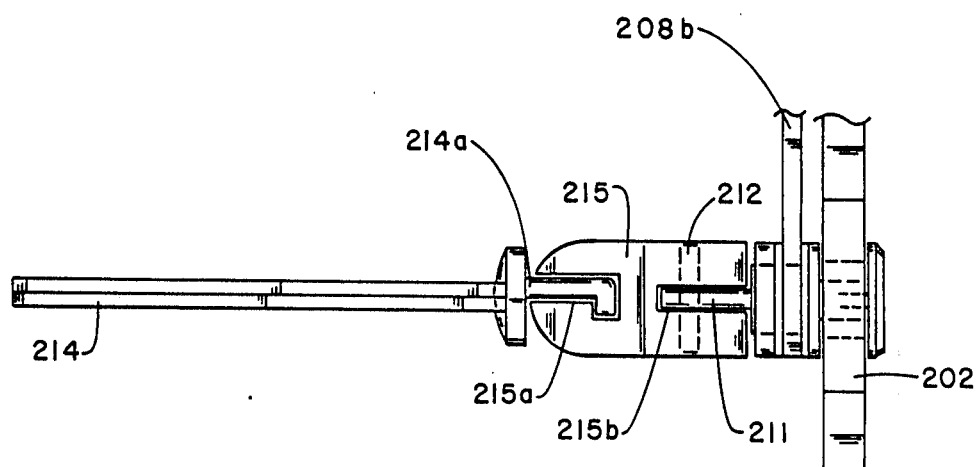
FIG. 23 is a front view of an interface used with an embodiment of the invention.
Figure 24:
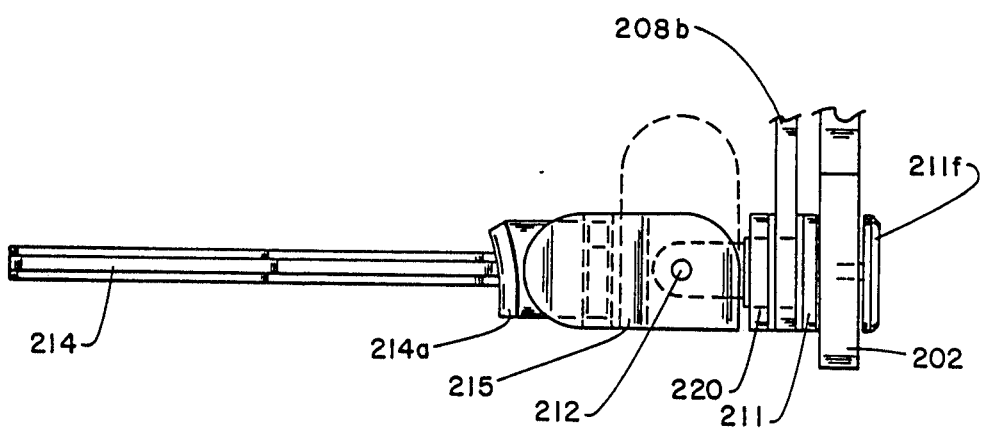
FIG. 24 is a plan view of the interface shown in FIG. 23.
Figure 25:
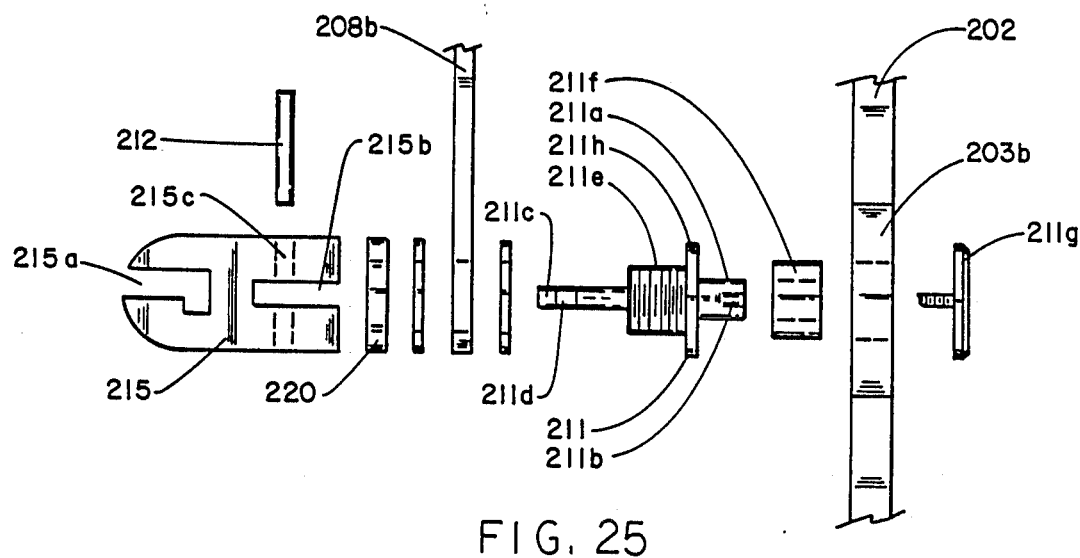
FIG. 25 is an exploded front view of the interface used in an embodiment of the invention; and, FIG. 26 is a partial side view of a carriage used in the embodiment of FIG. 15.
Figure 26:
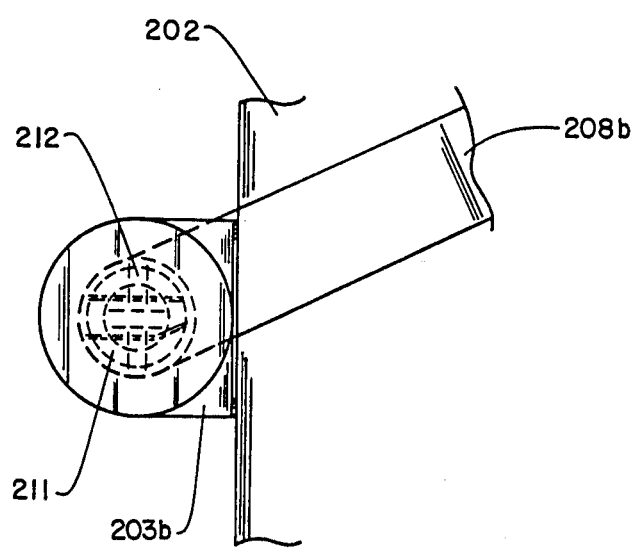

With respect to the operation of control valve 223, in FIG. 15 the surface 216 is in a level position while FIG. 19 shows the surface 216 tilted at an angle $\phi$ to the horizontal. Upon opening the piston's control valve 223, the U-shaped carriage 208 can be tilted relative to the floor to obtain the desired angular positioning of the surface 216. As the chair 228 is coupled to the carriage 208 by the coupling shaft 214, the chair 228 will also rock about its horizontal axis 232 in response to the movement of the carriage 208. As the adjustments are being made, the spatial distances between the surface 216 and the seated operator remain essentially constant. When the desired angle is obtained, the control valve 223 is closed to lock the setting. Once the control valve 223 is locked, the first surface pivot shaft 208d will not be able to move. Additionally, the chair 228 will no longer rock about its horizontal rocking axis 232.

A manually adjustable visual display stand 234 (FIG. 15) is placed on the second flat surface 218 and rotates about a pivot pin 236. A visual display device 19 rests on the stand 234. The display stand 234 telescopes to allow manual adjustment of the position of the display device 19. With this arrangement, it is necessary to separately adjust the position of the first device supporting means 216 and the manually adjustable visual stand 234. When the coupling action of the chair to the workstation is not desired, the interface 215 can be rotated about the locking pin 212 (as shown by the dotted lines in FIG. 24) so as to be out of the way.

While the invention has been particulary shown and described with reference to the preferred embodiments thereof, it will be understood by those skilled in the art that various alterations in form and detail may be made therein without departing from the spirit and scope of the invention. For example, the second flat surface 218 can be mounted in a number of ways not shown. Surface 218 could be attached to first surface 216 with an angled adjustable standing bracket. Alternatively, an adjustable arm having a first end attached to the first surface 216 and a second end attached to the second surface 218 can be used.

The embodiments of the invention in which an exclusive property or privilege is claimed are defined as follows:

1. A work station comprising:
   a chair for supporting a human operator in a seated position, said chair having means for supporting the thigh portion of a human and means for contacting the back portion of a human, said chair being rockable about a first horizontal axis;
   a carriage;
   a support surface upon which a first device is supportable, said device-supporting surface being attached to said carriage;
   carriage attaching means for attaching said carriage to said chair, said carriage attaching means including a position setting and locking means for pivoting said carriage about a second horizontal axis whereby said carriage pivots towards or away from said back portion of said chair, and whereby once said position setting and locking means is adjusted, the spatial distance between an operator seated in said chair and said device-supporting surface remains essentially constant in a relationship determined by said position setting and locking means as said chair is rocked about said first horizontal axis.

2. The work station of claim 1, further comprising:
   a second support surface upon which a second device is supportable, said second device-supporting surface being attached to said carriage.

3. A work station comprising:
   means for supporting a human operator in a seated position, said human supporting means having a first portion contactable by a thigh portion of the human anatomy and a second portion contactable by a back portion of the human anatomy, said first portion of said human supporting means having a front edge proximate the back of a seated human's knee, said human supporting means being rockable about a first horizontal axis;
   a carriage attached to said human-supporting means and pivotable about a second horizontal axis positioned proximate said first portion of said supporting means;
   means for supporting a first device, said first device supporting means being attached to said carriage;
   means for supporting a second device, said second device supporting means being attached to said carriage;
   means for locking the position of said carriage with respect to said human supporting means in a manner whereby a desired spatial distance separating at least one of said device supporting means from an operator seated in said human supporting means remains essentially constant as said human supporting means rocks about said first horizontal axis; and,
   an arm support means, said arm support means allowing said human operator's arm to rest in a range of positions, said arm support means following the natural horizontal range of motion of said arms.

4. A work station as recited in claim 3 wherein said arm support means pivots about an axis positioned proximate said second portion of said human operator supporting means.

5. A work station comprising:
   a chair for supporting a human operator in a seated position, said chair having thigh support means and back support means, said chair being rockable about a first horizontal axis;
   a frame located proximate said chair;
   a carriage;
   a first surface for supporting a first device, said first surface being connected to said carriage;
   a piston for moving said carriage relative to said frame; and,
   means for selectively coupling said carriage to said chair in a manner whereby the spatial distance between said chair and said first device-supporting surface remains essentially constant as said carriage is horizontally pivoted relative to said frame.

6. A work station as recited in claim 1, wherein said carriage is attached proximate said thigh portion of said chair.

7. A work station as recited in claim 1, whereby the spatial distance separating said device supporting surface from a seated human remain essentially constant as said chair rocks about said first horizontal axis.

8. A work station as recited in claim 1, including a support height adjusting means for adjusting the height of said device supporting surface on said carriage.

9. A work station as recited in claim 8, wherein said height adjusting means for said device supporting surface comprises a bracket having a height locking means, said bracket being attached to one side of said device supporting surface and sliding over said carriage for positioning said device supporting surface at a desired position on said carriage.

10. A work station as recited in claim 9, wherein said height adjusting means for said device supporting surface includes a support level adjusting means for adjusting the relative angle of said device supporting surface with respect to said carriage.

11. A work station as recited in claim 2, including means for adjusting the height of said second device supporting surface on said carriage.

12. A work station as recited in claim 11, wherein said height adjusting means for said second device supporting surface comprises a second bracket having a second height locking means, said second bracket being attached to one side of said second device supporting surface and sliding over said carriage for positioning said second device surface at a desired position on said carriage.

13. A work station as recited in claim 12, wherein said height adjusting means for said second device supporting surface includes a second support level adjusting means for adjusting the relative angle of said second device supporting device with respect to said carriage.

14. A work station as recited in claim 1, wherein said device supporting surface is surrounded by an enclosure having two sides and a back.

15. A work station as recited in claim 14, further comprising means for changing the angle of inclination of said device supporting surface, said inclination changing means including an actuator having one end attached to said carriage and said other end attached to said enclosure.

16. A work station as recited in claim 15, wherein said actuator includes a piston having one end attached to said carriage and the other end attached to said enclosure.

17. A work station as recited in claim 15 or 16, wherein said piston comprises an air cylinder.

18. A work station as recited in claim 17, wherein a valve to control said air cylinder is operatable at a position proximate said device supporting surface.

19. A work station as recited in claim 1 further including an arm support means, said arm support means allowing said human operator's arms to rest in a range of positions, said arm support means following the natural range of motion of said arms.

20. A work station as recited in claim 19 wherein said arm support means pivots about an axis positioned proximate said back portion of said chair.

21. A work station comprising:
a chair for supporting a human operator in a seated position, said chair having means for supporting the thigh portion of a human and means for contacting the back portion of a human, said chair being rockable about a first horizontal axis;
a carriage;
a first surface upon which a first device is supportable, said first device-supporting surface being attached to said carriage;
a second surface upon which a second device is supportable, said second device-supporting surface being attached to said carriage;
carriage attaching means for attaching said carriage to said chair, said carriage attaching means including a position setting and locking means for pivoting said carriage about a second horizontal axis proximate said thigh portion of said carriage towards or away from said back portion of said chair, whereby once said position setting and locking means is adjusted, the spatial distance between an operator seated in said chair and said first and second device-supporting surfaces remains essentially constant in a relationship determined by said position setting and locking means as said chair is rocked about said first horizontal axis.

22. A work station as recited in claim 21, wherein said carriage is attached proximate the front edge of said chair.

23. A work station as recited in claim 20, further comprises means for adjusting the level and the height of each respective surface.

24. A work station as recited in claim 23, wherein a pair of brackets attached to the sides of said device-supporting surfaces cooperate with said height and level adjusting means, said height and level adjusting means comprising:
a U-shaped bracket having two parallel surfaces spaced apart a predetermined distance by a third perpendicular surface, each surface having a hole therein, said U-shaped bracket being placed on said carriage.

25. A work station as recited in claim 21, wherein each device-supporting surface has a lip on the top front surface nearest the human seated in said chair, said lip keeping items placed on said device-supporting surfaces from falling off.

26. A work station as recited in claim 21 further including an arm support means, said arm support means allowing said human operator's arms to rest in a range of positions, said arm support means following the natural horizontal range of motion of said arms.

27. A work station as recited in claim 26 wherein said arm support means pivots about an axis positioned proximate said portion of said human operator supporting means.

28. A work station as recited in claim 10 wherein said support level adjusting means adjusts the fore and aft position of said device supporting surface on said carriage.

29. A work station as recited in claim 13 wherein said second support level adjusting means adjusts the fore and aft position of said second device supporting means on said carriage.

30. A work station as recited in claim 23 wherein said adjusting means adjusts the fore and aft position of each respective surface.

* * * * *